US008360505B2

(12) United States Patent
Iijima

(10) Patent No.: US 8,360,505 B2
(45) Date of Patent: Jan. 29, 2013

(54) VEHICLE DOOR OPENING DEVICE

(75) Inventor: Kenichi Iijima, Yokohama (JP)

(73) Assignee: Mitsui Kinzoku Act Corporation (JP)

( * ) Notice: Subject to any disclaimer, the term of this patent is extended or adjusted under 35 U.S.C. 154(b) by 374 days.

(21) Appl. No.: 12/476,580

(22) Filed: Jun. 2, 2009

(65) Prior Publication Data

US 2009/0302637 A1 Dec. 10, 2009

(30) Foreign Application Priority Data

Jun. 4, 2008 (JP) ................................ 2008-146931

(51) Int. Cl.
*B60J 5/06* (2006.01)

(52) U.S. Cl. ........................ 296/155; 49/280; 296/146.4

(58) Field of Classification Search .................. 296/155, 296/146.4; 49/360, 449, 280
See application file for complete search history.

(56) References Cited

U.S. PATENT DOCUMENTS

| | | | | |
|---|---|---|---|---|
| 5,263,762 | A * | 11/1993 | Long et al. | 296/146.4 |
| 5,640,807 | A * | 6/1997 | Shigematsu et al. | 49/449 |
| 6,079,767 | A | 6/2000 | Faubert et al. | |
| 6,633,094 | B1 * | 10/2003 | Andou | 307/326 |
| 6,739,646 | B2 | 5/2004 | Suzuki et al. | |
| 7,126,296 | B1 * | 10/2006 | Burlak et al. | 318/280 |
| 2007/0132273 | A1 * | 6/2007 | Suzuki et al. | 296/155 |

FOREIGN PATENT DOCUMENTS

JP 3931572 3/2007

* cited by examiner

*Primary Examiner* — Glenn Dayoan
*Assistant Examiner* — Melissa A Black
(74) *Attorney, Agent, or Firm* — Ostrolenk Faber LLP

(57) ABSTRACT

A door is open and held by engaging a latch with a striker of a vehicle body. The door has a release actuator connected to the latch. The vehicle body includes a power drive and a control module. An operating unit instructs the control module to close the door. The control module instructs the release actuator to disengage the latch from the striker. After the control module instructs the power drive to start closing of the door, releasing of the release actuator is stopped by the control module at a door position determined by actual voltage of a power source.

7 Claims, 4 Drawing Sheets

VEHICLE DOOR OPENING DEVICE

BACKGROUND OF THE INVENTION

The present invention relates to a vehicle door opening device for moving a door to close from a fully-open position.

In a vehicle door opening device in JP 3,931,572 B2, when a sliding door in a vehicle body is closed from a fully-open position, a release actuator is driven with a switch to allow a fully-open latch for holding the sliding door in the fully-open position to be released, and a power drive is driven to allow the sliding door to close from the fully-open position. When a certain time passes after the release actuator is driven, the release actuator is instructed to stop and the fully-open latch is controlled to return to the rest before releasing.

However, in the vehicle door opening device in the patent, to ensure a series of actions of the fully-open latch from release starting of the release actuator to the rest, a time for controlling the release actuator is set to be longer, so that a returning sound comes out in a little time after the sliding door starts to close when the release actuator and fully-open latch return to the rest from the release state. Thus, after an initial sound comes out when the sliding door starts, a returning sound comes out of the release actuator and the fully-open latch, so that the sound is noticeable thereby decreasing its quality. The initial sound stands for a sound when a ricketying between the power drive and the sliding door and loosening of a cable for transmitting power of the power drive to the sliding door are absorbed. If a certain time is set to be shorter in order that time for generating initially actuating sound and returning sound is shortened, the release actuator is driven and stopped although the fully-open latch does not move to a position where the latch completely leaves the striker when actual voltage of a power source is low and when closing velocity of the sliding door is slow, so that the fully-open latch is likely to engage with the striker of the vehicle body and to make it impossible for the sliding door to close.

SUMMARY OF THE INVENTION

In view of the disadvantages as above, it is an object of the invention to provide a vehicle door opening device ensuring a series of actions of a fully-open latch when a door is closed from a fully-open position, a returning sound of a release actuator and a fully-open latch being not noticeable.

BRIEF DESCRIPTION OF THE DRAWINGS

The features and advantages of the invention will become more apparent from the following description with respect to an embodiment as shown in accompanying drawings.

DETAILED DESCRIPTION OF PREFERRED EMBODIMENT

Figure 1:
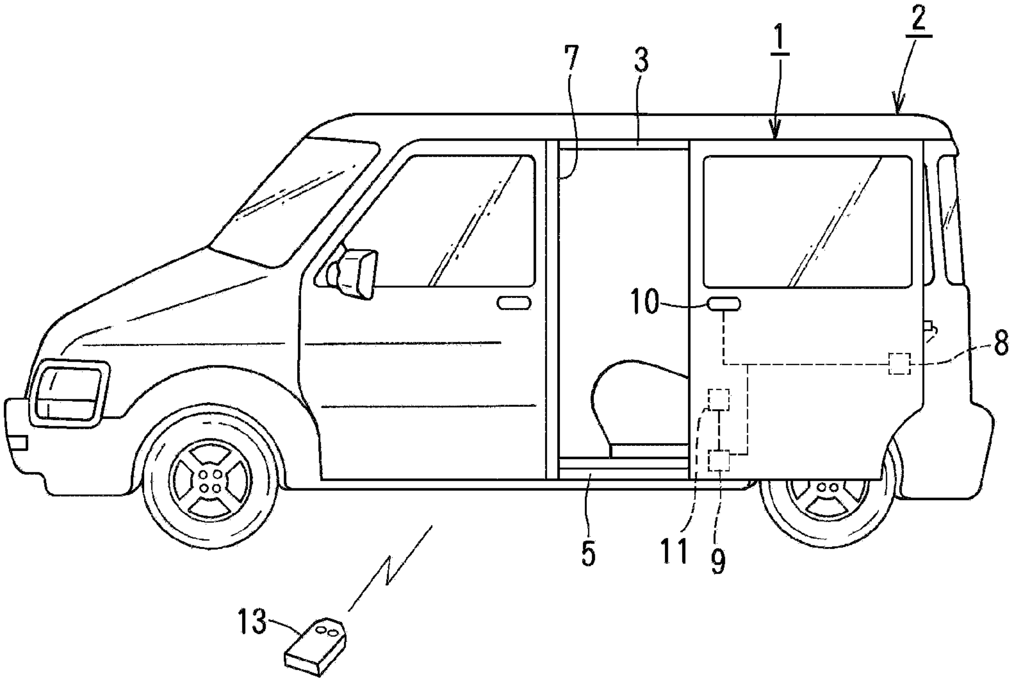
FIG. 1 is a side elevational view of a motor vehicle comprising one embodiment of the present invention.
Figure 2:
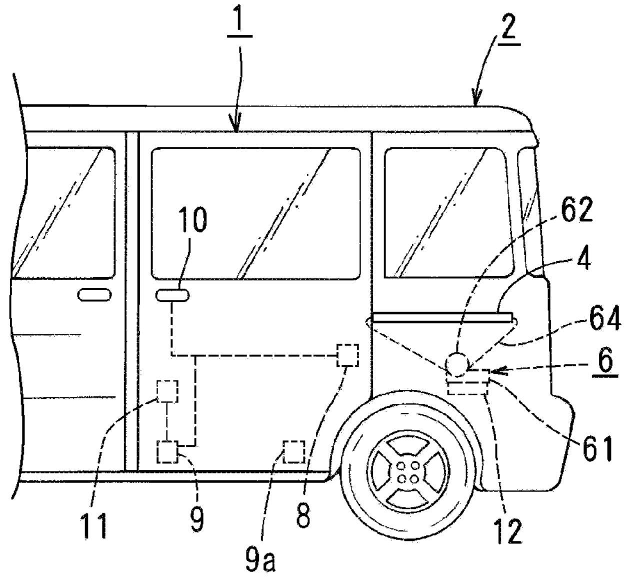
FIG. 2 is a side elevational view of a rear half of the vehicle when a sliding door is in a fully-closed position.

A sliding door 1 for minivans or station wagons is supported by upper, middle and lower guide rails 3,4,5 fixed on a vehicle body 2 and can move manually or by a power drive 6 from a fully-closed position in FIG. 2 in which an entrance 7 at the side of the vehicle body 2 is closed, to a fully-open position in FIG. 1 in which the door 1 is moved rearward along the side and is in the back of the vehicle body 2 and vice versa.

A fully-closed latch 8 is provided at the rear end within the sliding door 1 and engages with a striker (not shown) fixed to the vehicle body 2 allowing the sliding door 1 to be held in the fully-closed position.

At the lower end of the front part of the sliding door 1, there is a lower roller (not shown) that can move along the lower guide rail 5. The lower latch has a fully-open latch 9 that engages with a striker 9*a* at the rear end of the lower guide rail to allow the sliding door 1 to be held in the fully open position.

The fully-open latch 9 is connected to an exterior handle 10 on the sliding door 1 outside the vehicle and an interior handle (not shown) and a fully-open releasing actuator 11 within the sliding door 1; and disengaged from the striker manually with the exterior handle 10 or interior handle or with the fully-open release actuator 11 to enable the sliding door 1 to be closed.

The fully-open release actuator 11 includes a power drive source comprising a motor or a solenoid. The power drive source is driven with a switch 13 such as a wireless switch or a switch by a driver's seat or the vehicle body 2. So a release lever (not shown) of the fully-open latch 9 is moved from a rest position to a release position to allow the fully-open latch 9 to disengage from the striker. While an electric current flows through the fully-open release actuator 11 by the power drive source, the fully-open latch 9 is held in a release state in which it cannot engage with the striker.

The power drive 6 within the side of the vehicle body 2 comprises a reversible PSD (power sliding door) motor 61; a rotary drum 62 that can be rotated by the PSD motor 61 via a reduction gear (not shown); an electromagnetic clutch 63 that connects and disconnects a power transmission path between the PSD motor 61 and the rotary drum 62; and a power-transmission cable 64 which is wound on and out of the rotary drum 62, extends along the middle guide rail 4 and is coupled to the rear end of the sliding door 1.

When the electromagnetic clutch 63 disconnects the power transmission path, the sliding door 1 can be opened manually by a small force without subjecting to resistance for reversing the PSD motor 61. While the PSD motor 61 does not work, the power transmission path is connected by the electromagnetic clutch, and a braking force is exerted to the sliding door 1 which opens and closes, by a resistant force for reversing the PSD motor 61.

On the rotary drum 62 that rotates together with opening and closing of the sliding door 1, there is provided a rotation sensor 65 for detecting a rotation angle of the rotary drum 62 at high resolution. The rotation sensor 65 comprises a rotary encoder for generating a pulse signal corresponding to the rotation angle of the rotary drum 62 (corresponding to a travel of the sliding door 1) and a turning direction (corresponding to a traveling direction of the sliding door 1).

A control module 12 in the vehicle body 2 controls drive and stop of the power drive 6 and the fully-open release actuator 11.

Figure 3:
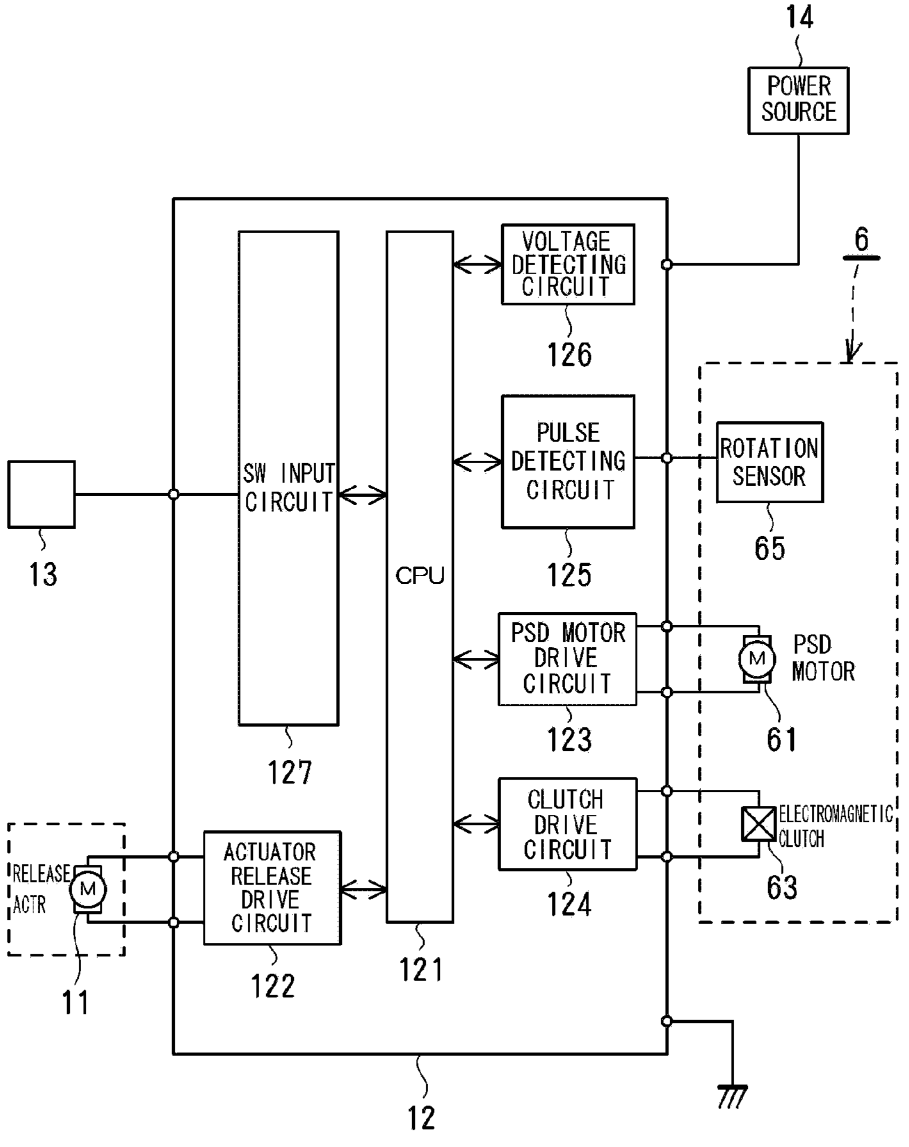
FIG. 3 is a block diagram of a control circuit.

In FIG. 3, the control module 12 comprises a CPU 121, drive circuits 122, 123, 124, a pulse detecting circuit 125, a voltage detecting circuit 126 and an SW input circuit 127, and is electrically connected to the fully-open release actuator 11 via the actuator release drive circuit 122, to the PSD motor 61 via the PSD motor drive circuit 123, to the electromagnetic clutch 63 via the clutch drive circuit 124 and to the rotation sensor 65 via the pulse detecting circuit 125. The voltage detecting circuit 126 detects an actual voltage of the power source 14 having DC12V as rated voltage.

Figure 4:
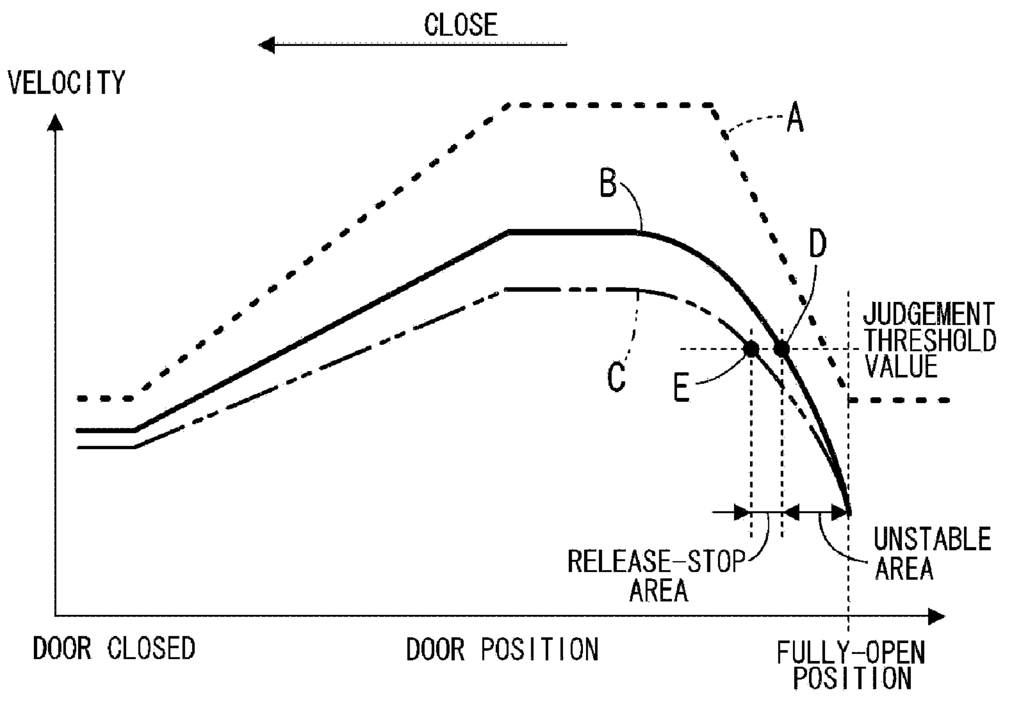
FIG. 4 is a graph showing relationship of velocity to a position of a door.

The CPU 121 comprises a door-position detecting circuit for detecting the present position of the sliding door 1 based on a signal output from the pulse detecting circuit 125 for converting a pulse signal from the rotation sensor 65, and a door velocity measuring circuit. In the CPU 121, as shown by a broken line A in FIG. 4, a target velocity is formerly set and stored corresponding to the traveling direction and position of the sliding door 1. Furthermore, depending on the traveling direction and position of the sliding door 1, a value is calculated on the basis of a voltage coefficient etc. determined by the target velocity and actual voltage of the power source, and stored. A solid line B in FIG. 4 is the calculated maximum value corresponding to the velocity calculated when the actual voltage value of the power source 14 is the maximum such as 16V. A two-dot-dash line C is the calculated minimum value corresponding to the velocity when the actual voltage value of the power source 14 is the minimum such as 11 V.

A release-stop door position for stopping the fully-open release actuator 11 is determined by a position where a value calculated based on the target velocity and actual voltage of the power source 14 reaches formerly determined judgment threshold value. For example, when the actual voltage of the power source 14 is the maximum voltage, the release-stop door position is a position D, and when the actual voltage of the power source 14 is the minimum voltage, the release-stop door position is a position E away from the position D in a closing direction. The area between the positions D and E is formerly set as release stop area for stopping the fully-open release actuator 11.

For example, when the actual voltage of the power source 14 is 16 V, the door closing velocity is greater than that of 11 V, so that the door traveling distance from the calculated value to the threshold value gets shorter. As actual voltage of the power source 14 increases, a release-stop door position for stopping the fully-open release actuator gets closer to the fully-open position in the release stop area. Thus, when the actual voltage of the power source 14 is high and when the sliding door closes faster, a returning sound when the fully-open release actuator 11 and the fully-open latch 9 returns from the release state to the rest comes out just after the sliding door 1 starts closing. The sound gets less noticeable. Even if the sliding door 1 is instructed to stop just after the sliding door 1 starts to close, the fully-open latch 9 does not engage with the striker again because the sliding door 1 closes faster, ensuring a series of actions in which the fully-open latch 9 returns from the release state to the rest.

During predetermined initial term after the sliding door 1 starts to close from the fully-open position, the closing of the sliding door 1 is not stable and it is very difficult to detect the present position of the sliding door 1 exactly because the path between the power drive 6 and the sliding door gets rickety and the cable 64 loosens. Accordingly, in this embodiment, in order to detect the release-stop door position exactly, the releasing stop area is set beyond the unstable area corresponding to the initial period. However, the present invention is not limited thereto. For example, by ignoring the unstable area, it is possible to set the release stop area to a position closer to the fully-open position.

Figure 5:
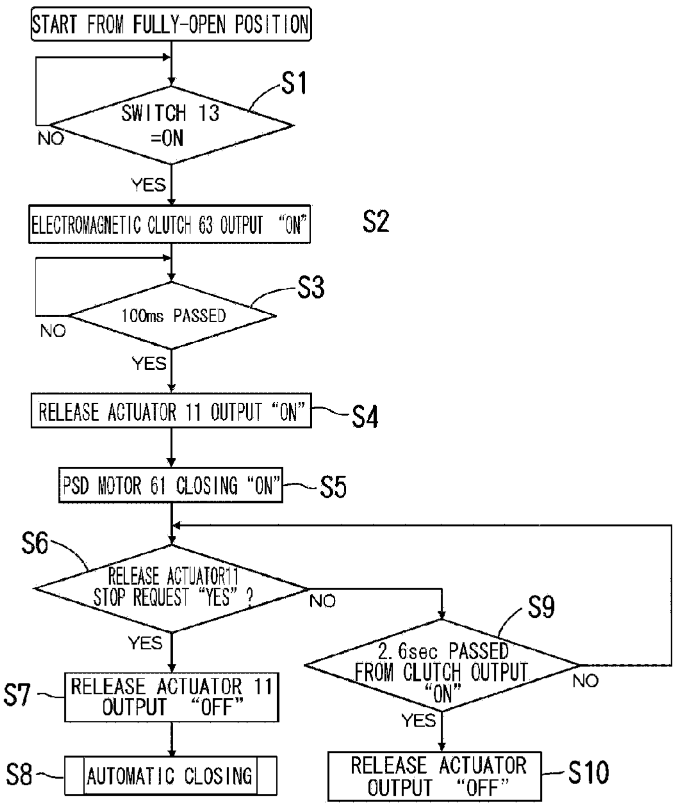
FIG. 5 is a flowchart showing a closing action from a fully-open position.
Figure 6:
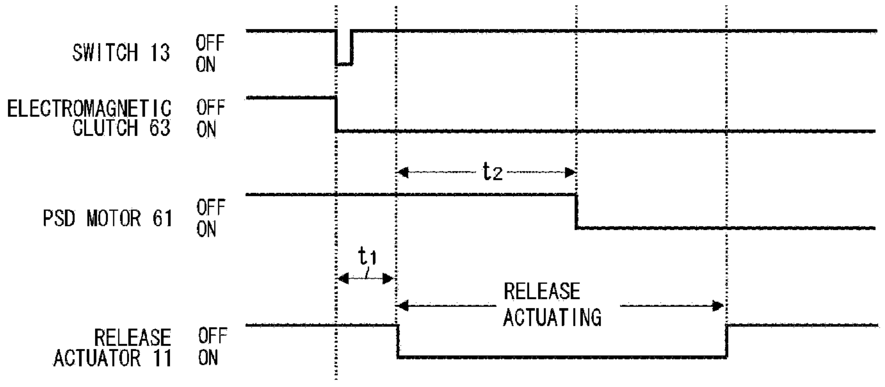
FIG. 6 is a view showing the closing action from the fully-open position.

Then, the closing of the sliding door 1 will be described with respect to the flowcharts in FIGS. 5 and 6. When the sliding door 1 is held in the fully-open position, the fully-open latch 9 engages with the striker and the fully-open position of the sliding door 1 is detected with the door-position detection circuit. In the step S1, when the switch 13 is actuated to close the door, the control module 12 instructs connecting of the electromagnetic clutch 63 of the power drive 6 according to a closing signal from the switch 13. With the electromagnetic clutch 63, an operating force transmission path between the PSD motor 61 and the rotary drum 62 in the power drive 6 is connected, thereby exerting a driving force to the sliding door 1. Furthermore, the control module 12 formerly determines the release-stop door position based on the present actual voltage of the power source 14.

In the step S3, since the electromagnetic clutch 63 instructs connecting, a timer of the control module 12 instructs time t1 such as 100 msec, and in the step S4, the control module 12 instructs the fully-open release actuator 11 of the releasing. Thus, the fully-open latch 9 is disengaged from the striker with the fully-open release actuator 11, enabling the sliding door 1 to close.

After the control module 12 instructs the fully-open release actuator 11 to be driven for releasing, a predetermined time t2 passes and in the step S5, the PSD motor of the power drive 6 is instructed to be driven for closing the door 1. Thus, the power drive 6 starts closing the door 1 based on the instructions for closing, making the sliding door 1 to close from the fully-open position.

The door-position detecting circuit counts a pulse signal tapped off from the rotation sensor 65 which rotates with the rotary drum 62, so that the direction of motion and the present position of the sliding door 1 are detected.

When it is detected that the sliding door 1 is moved to the release stop area, the control module 12 compares whether or not the present position of the sliding door 1 is in the release stop area determined by the actual voltage of the power source 14. If the present position of the sliding door 1 is in the release-stop door position, it is judged that there is a stop request in the fully-open release actuator, so that the fully-open release actuator 11 is instructed to stop the release in the step S7. Thus, with the stop of the release in the fully-open release actuator 11, the fully-open latch 9 returns to the rest from the release state. In the step S8, the sliding door 1 is moved to the fully-open position by the power drive 6.

In the step S6, if it is not detected that the sliding door 1 is in the release-stop door position, it proceeds to the step S9. If a predetermined time t3 such as 2.6 sec passes in the step S9 after the electromagnetic clutch 63 is instructed of connection, it proceeds to the step S10 in which the fully-open release actuator 11 is instructed of releasing. Thus, even if the sliding door 1 does not move to the release-stop door position within the predetermined time t3 of starting of the power drive 6, release of the fully-open release actuator 11 is stopped to allow the fully-open latch 9 to return to the rest.

The foregoing merely relates to an embodiment of the invention. Various changes and modifications may be made by those skilled in the art without departing from the scope of claims wherein:

What is claimed is:

1. A vehicle door opening device configured to open a vehicle door of a vehicle with a vehicle body having a striker, the vehicle door opening device comprising;

an operating unit configured to instruct opening and closing the vehicle door;

a fully-open latch positioned in the vehicle door, the fully-open latch configured to engage with the striker of a vehicle body so as to hold the vehicle door in a fully-open position of the vehicle door;

a fully-open release actuator positioned in the door, the fully-open release actuator being configured to disengage the fully-open latch from the striker so as to allow the door to close;

a power drive provided in the vehicle body and configured to close the vehicle door, the power drive comprising a rotation sensor positioned in a rotary drum;

a power source configured to supply electric power to the fully-open release actuator and the power drive; and a control module comprising:

an SW input circuit configured to respond to the operating unit, a CPU connected to the SW input circuit, and the CPU configured to store a target velocity corresponding to a traveling direction and a position of the door, and a voltage detecting circuit connected to the CPU and configured to detect actual voltage of the power source, wherein the CPU is configured to store, as a maximum calculated value, a velocity obtained when actual voltage of the power source is a maximum voltage, and to store, as a minimum calculated value, a velocity obtained when actual voltage of the power source is a minimum voltage, and said control module is configured to transmit a stop signal for releasing of the fully-open release actuator when the control module determines the position of the door, such that the determining of the position of the door is based on the actual voltage of the power source detected, the door position being determined according to the actual voltage of the power source detected, wherein the door position is determined as being closer to a fully-open position as the actual voltage of the power source detected gets higher.

2. The device of claim 1, wherein the operating unit comprises a wireless switch.

3. The device of claim 2, wherein the door comprises a sliding door.

4. The device of claim 2, wherein the control module comprises a voltage detecting circuit connected to the power source to detect the actual voltage of the power source, and a CPU.

5. The device of claim 4, wherein the control mode instructs stop of releasing of the fully-open release actuator when the control module can not detect that the door moves to the door position within a predetermined time after the power drive instructs starting of closing of the door.

6. The device of claim 3, wherein the power drive comprises a reversible PSD motor, a rotary drum rotated by the PSD motor, an electromagnetic clutch that connects and disconnects a power transmission path between the PSD motor and the rotary drum, and a cable wound on the rotary drum and coupled to the sliding door.

7. The device of claim 6, wherein the control module further comprises an actuator release drive circuit connected to the fully-open release actuator, a PSD motor drive circuit connected to the PSD motor of the power drive, a clutch drive circuit directed to the electromagnetic clutch of the power drive, a pulse detecting circuit connected to the rotary sensor, and an SW input circuit responding to the operating unit.

* * * * *